United States Patent [19]

Eggers

[11] 3,982,869
[45] Sept. 28, 1976

[54] INJECTION MOLDING APPARATUS WITH ALTERNATIVELY SHUTTLED MOLD SECTIONS

[76] Inventor: James W. Eggers, 1018 Bridal Wreath, Shreveport, La. 71108

[22] Filed: July 22, 1974

[21] Appl. No.: 490,722

[52] U.S. Cl. .............................. 425/246; 425/357; 425/411
[51] Int. Cl.² .......................................... B29F 1/00
[58] Field of Search .......... 425/246, 190, 192, 451, 425/453, 454, 183, 185, 357, 411, 415

[56] References Cited
UNITED STATES PATENTS

| | | | |
|---|---|---|---|
| 2,983,953 | 5/1961 | Borah | 425/357 |
| 3,128,501 | 4/1964 | Borah | 425/444 |
| 3,129,462 | 4/1964 | Borah | 425/351 |
| 3,343,218 | 9/1967 | Borah | 425/195 |
| 3,712,779 | 1/1973 | Luginbuhl | 425/411 |

FOREIGN PATENTS OR APPLICATIONS 2,062,432  7/1971  Germany .......................... 425/190

Primary Examiner—Francis S. Husar
Assistant Examiner—Carl Rowold
Attorney, Agent, or Firm—Hubbard, Thurman, Turner & Tucker

[57] ABSTRACT

A multiple mold assembly is disclosed for molding articles in an injection molding apparatus. The assembly includes two molding sections that are alternatively shuttled from positions wherein one of the molding sections is in position for a molding operation, and the other molding section is in position for loading of inserts, performing preparatory or finishing operations, or removal of molded articles, to the reverse positions. The shuttle assembly of this invention is particularly adapted for use in a horizontal injection molding apparatus and for insert molding.

13 Claims, 5 Drawing Figures

INJECTION MOLDING APPARATUS WITH ALTERNATIVELY SHUTTLED MOLD SECTIONS

This invention relates to injection molding, and in one of its aspects to a multiple, shuttle mold assembly for use in a horizontal injection molding apparatus.

Injection molding may be employed in either horizontal or vertical molding machines. Vertical molding machines are those in which the clamp moves in a vertical plane and molding is accomplished in a horizontal plane. In the typical horizontal molding apparatus, a fixed platen and a movable platen are provided which are generally connected together by four large connecting rods, disposed at the four corners of the platens. The movable platen is moved by hydraulic cylinder in a horizontal plane and molding is accomplished in a vertical plane by closing the platens on a molding section including one or more mold cavities. However, if the molding apparatus employes only a single molding section it must be removed from the molding position and loaded or unloaded prior to or just after each molding operation, thus interrupting the continuity of the operation.

One of the advantages in the past of employing vertical molding apparatus over the horizontal apparatus was that multiple molding sections could be used so that while a molding operation was being accomplished with one of the sections, inserts could be loaded into the other section, preparatory or finishing operations performed, or molded articles removed from the other sections. Further, by use of multiple molding sections, which can be alternatively positioned between the platens of the molding apparatus, it is possible to maintain a uniform rate of molding and curing. However, in the past, because of the corner connecting rods, it has been difficult to provide multiple molding sections in a horizontal injection molding apparatus, and insofar as known to applicant, this has not been previously provided by the prior art. Also, if multiple molding sections are employed in the molding apparatus, in order to permit the movable platen to move the same distance each stroke, the molding sections must be positioned at substantially the same distance from the fixed platen as closing of the mold occurs, and this requirement complicates the design of such a molding apparatus.

A further advantage of employing a horizontal molding apparatus employing multiple molding sections is that, because of the ability to obtain a substantial uniform rate of molding and curing, runnerless molding can be provided whereas it has been very difficult in the past to unload insert molded articles from a vertical molding apparatus without the formation of runners.

It is therefore the primary object of the present invention to provide for molding in a horizontal injection molding apparatus by the use of multiple molding sections to thus provide the advantages attendant with the use of multiple molding sections, and also permit removal of articles without the formation of runners. Also, while the molding section is being loaded for insert molding, the machine is not idle, so that a substantial increase in the number of molded articles is provided in a set period of time by the use of multiple molding sections.

It is a further object of this invention to provide a shuttle molding assembly including multiple molding sections which may be readily installed into a conventional horizontal type injection molding apparatus in place of a single molding section.

It is another object of this invention to provide such an assembly that can be so installed without the necessity of substantial modification of the injection molding apparatus.

Another object of this invention is to provide such an assembly in which the molding sections are automatically positioned at substantially the same distance from a fixed platen in the molding apparatus.

These and other objects of this invention, which will be apparent upon consideration of the appended drawings and claims and the detailed description of the drawings to follow, are accomplished according to this invention by providing a shuttle molding assembly adapted to be mounted between the movable and fixed platen of a conventional horizontal type injection molding apparatus. A carrier mechanism which is movable in the direction of movement of the movable platen of the molding apparatus is mounted on the shuttle mold assembly and two holding sections, each including at least one mold cavity, are mounted on the carrier mechanism to move along axes perpendicular to the direction of movement of the movable platen so each molding section can be alternatively positioned between the platens for a molding operation, and positioned adjacent the position between the platens where molded articles can be removed from the mold cavities, secondary operations performed, or articles for insert molding inserted into the molding cavities. In this manner, while a molding operation is performed with one of the molding sections between the platens, and with the platens and molding section closed together, previously molded parts can be finished and/or removed, and the cavities prepared for the next molding operation such as by installing inserts. Thus, a substantially continuous molding operation at a uniform rate can be provided, and since the molding apparatus is not idle during loading, a substantial increase in its output over a set period of time is provided. Also, if desired, runnerless molding can be provided. Referring now to the drawings, wherein like reference numerals are used throughout to designate like parts and wherein a preferred embodiment of this invention is illustrated, FIG. 1 is a prespective view in elevation of a horizontal injection molding apparatus employing the present invention;

Figure 1:
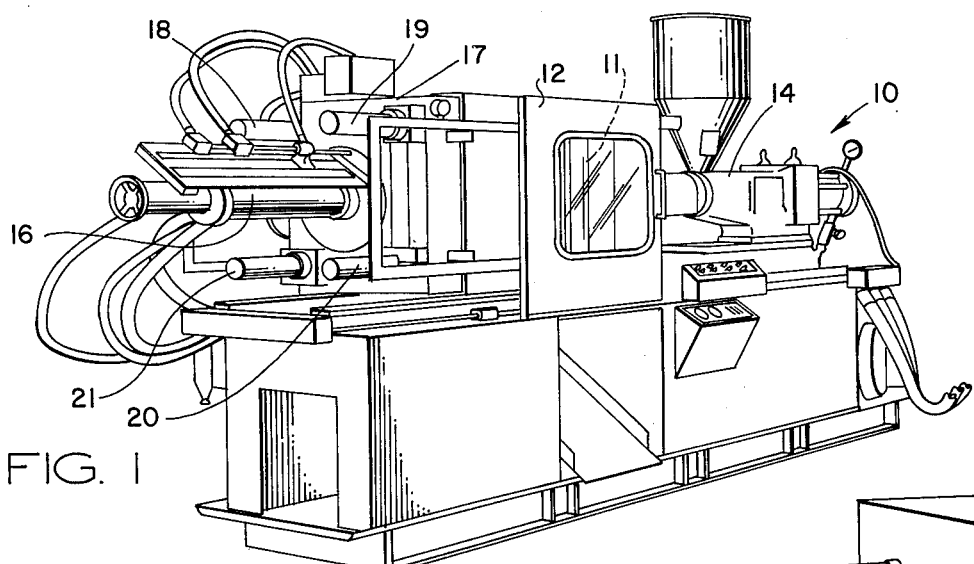

Referring now to FIG. 1, a conventional horizontal injection molding apparratus 10 is illustrated as including a molding chaber 11 (shown by a dotted reference line) into which entry is provided by a sliding door 12, which may include a window to permit observation of chamber 11. Apparatus 10 includes a fixed platen 13 (shown in phantom in FIG. 2) through which an injection molding material is fed from the feed end 14 of apparatus 10 through conventional means such as a conduit 14a illustrated, which is connected to the feed mechanism. In addition, apparatus 10 includes a movable platen 15 (shown in phantom in FIG. 2) driven by a hydraulic cylinder 16 mounted on the platen drive end 17 of apparatus 10. As is conventional in such apparatus, and as illustrated in FIG. 1, platens 13 and 15 are mounted in alignment on four corner rods 18, 19, 20 and 21 so that platen 15 moves in a horizontal plane towards and away from platen 13 to permit closing on a molding section inserted between them for an injection molding operation.

Figure 2:
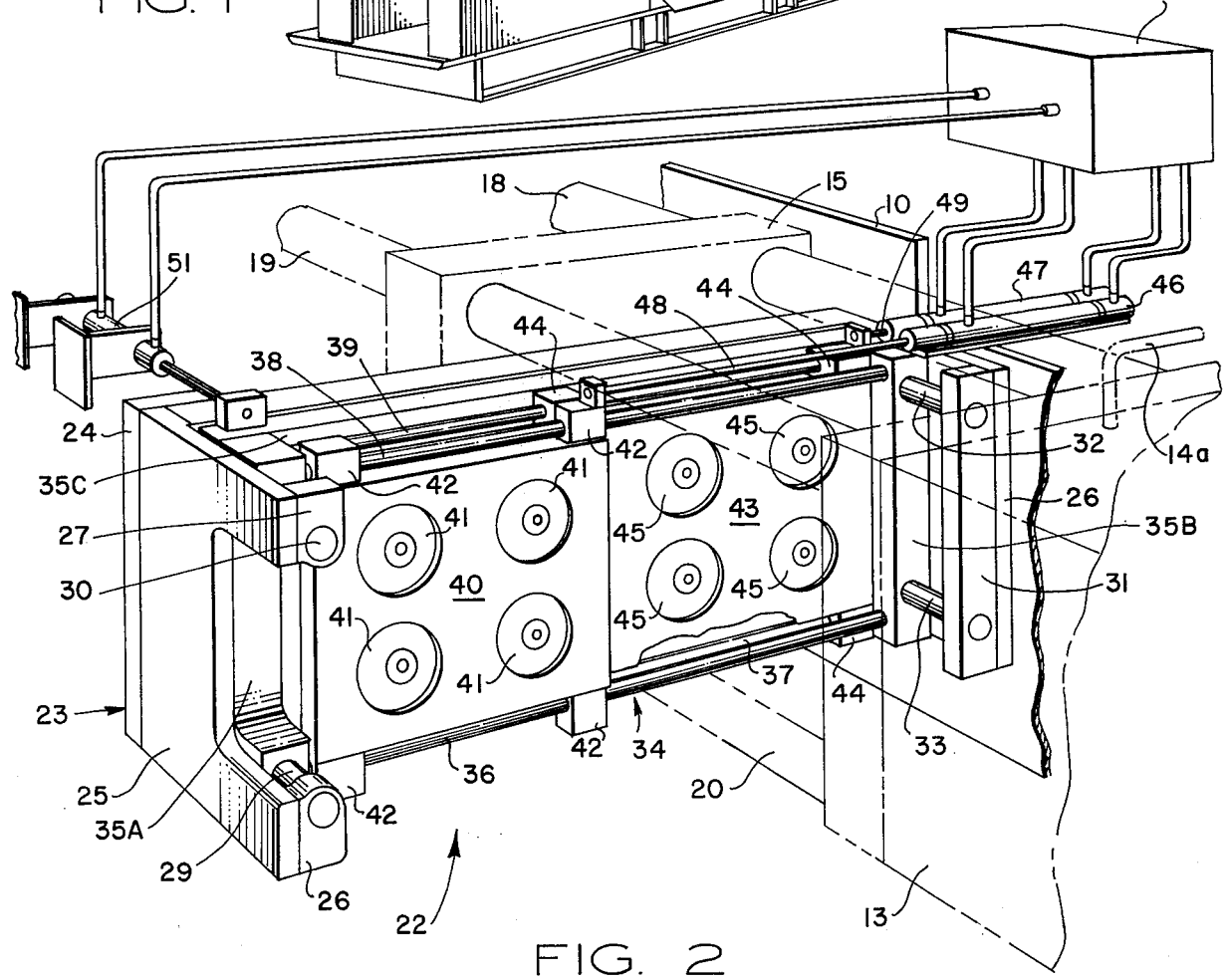
FIG. 2 is a perspective view in elevation of the shuttle mold assembly of this invention.

The present invention provides a multiple, shuttle mold assembly 22, illustrated in FIG. 2, which is particularly adapted to be mounted in molding chamber 11 of molding apparatus 10, between platens 13 and 15 and between corner rods 18, 19, 20 and 21, to provide for a substantially continuous, and uniformly timed, molding operation in apparatus 10. Assembly 22 includes a bracket-shaped rigid frame 23 including a back plate 24 and end plates 25 and 26, and frame 23 may be mounted in molding apparatus 10, between platens 13 and 15, with back 24 mounted on movable platen 15, so that frame 23 and thus assembly 22 moves with platen 15. End plate 25 is generally U-shaped to aid in access to the interior of molding chamber 11, and includes flanges 27 and 28 extending therefrom towards end plate 26. Flanges 27 and 28 include openings in which spaced shafts 29 and 30 are mounted, at one end thereof. The other ends of shafts 29 and 30 extend into openings in back wall 24. A flange plate 31 is mounted on the end of plate 26 opposite to where it is connected to back plate 24, and extends towards end plate 25. Plate 31 includes spaced openings in which spaced shafts 32 and 33 are mounted at one end, and shafts 32 and 33 extend to openings (not shown) in back plate 24 at their other end.

Shuttle mold assembly 22 includes a carriage mechanism 34 having end blocks 35A and 35B respectively, which are slidably mounted on shafts 29, 30, 32 and 33 to move towards and away from back plate 24, and a plate 35C connected between end blocks 35A and 35B, adjacent to and parallel with back plate 24. As illustrated in FIG. 2, four spaced shafts 36, 37, 38 and 39 are also connected between end blocks 35A and 35B, with shafts 36 and 37 extending between the lower ends of blocks 35A and 35B, and shafts 38 and 39 extending between the upper ends of blocks 38 and 39. Shafts 36 and 38 are oppositely disposed from each other in the same vertical plane, as are shafts 37 and 39.

In accordance with this invention, multiple molding sections are slidably mounted on shafts 36, 37, 39 to shuttle alternatively between a molding position platens 13 and 15, (the area between platens 13 and 15 also comprising a molding zone), and a position external of this position wherein molded articles may be removed. As illustrated in FIG. 2, a first molding section or shuttle mold is provided by a flat plate 40 including four molding cavities 41 therein, and is mounted by corner flanges 42 to slide along rods 36 and 38 across shuttle mold assembly 22 to provide for molding in a vertical plane. A second molding section or shuttle mold is provided by a flat plate 43 which is mounted on rods 37 and 39 through corner flanges 44 (only three of which are shown in the drawings) so that molding section 43 moves in a vertical plane across frame 22 (but behind molding section 40) and in and out of the molding zone between platens 13 and 15. Molding section 43 also includes four molding cavities 45.

While the configuration of molding cavities 41 and 45 is shown as circular, for the purpose of illustration, the apparatus of this invention may be readily used to mold articles of different configurations, and it may be used in insert molding wherein an item is inserted in the cavity prior to molding the finished article itself.

In the illustration of FIG. 2, molding section 43 is shown at the position between platens 13 and 15 wherein it can be moved by movable platen 15 against fixed platen 13 for the performance of an injection molding operation. Molding section 40 is illustrated in position wherein molded articles may be readily removed, either automatically by suitable means (not shown) or by an operator, or previously formed articles can be inserted in mold cavities 41 for an insert molding operation. Also, if desired suitable automatic means (not shown) can be provided for removal of the molded articles with the molding sections still in the molding zone and as the mold opens.

In accordance with this invention, means is provided for alternatively shuttling molding sections 40 and 43 between the respective positions defined. As illustrated, this means includes double acting hydraulic cylinders 46 and 47 mounted on end block 35B to move with carriage mechanism 34. Hydraulic cylinder 46 is connected through a piston rod 48 to the closest flange 42 on top of molding section 40, to control the movement of molding section 40 towards and away from the molding positions. Also, hydraulic cylinder 47 includes a piston rod 49 connected to the closest flange 44 on top of molding section 43, to move section 43 along spaced shafts 37 and 39 to and from the molding position between platens 13 and 15.

Hydraulic cylinders 46 and 47 are connected to an electro-hydraulic control means 50 which includes suitable timing and switching circuits (not shown) for controlling the sequence of operation of the shuttling of molding sections 40 and 43 alternatively between their respective positions. The switching and timing circuits, and the valving of the hydraulic employed, may be of conventional design to provide the required timing and sequence control.

In accordance with this invention, means is also provided for automatically positioning carriage mechanism 34 and molding sections 40 and 43 at substantially the same distance from movable platen 15 upon completion of each molding cycle so that molding sections 40 and 43 clear support block 52 as they move in and out of the molding zone. This means consists of one or more hydraulic cylinders and mechanisms mounted on apparatus 10 so that contact is made with the carriage mechanism 34 causing it to move along shafts 29, 30, 32 and 33 away from back plate 24 of assembly 22, and in the direction of movement of movable platen 15 at the proper time as determined by electromechanical circuit 50. For the purpose of illustration, a hydraulic cylinder 51 is shown in FIG. 2 for moving the carriage mechanism; however, the existing ejector mechanism of many molding machines can be used instead of cylinder 51.

Figure 3:
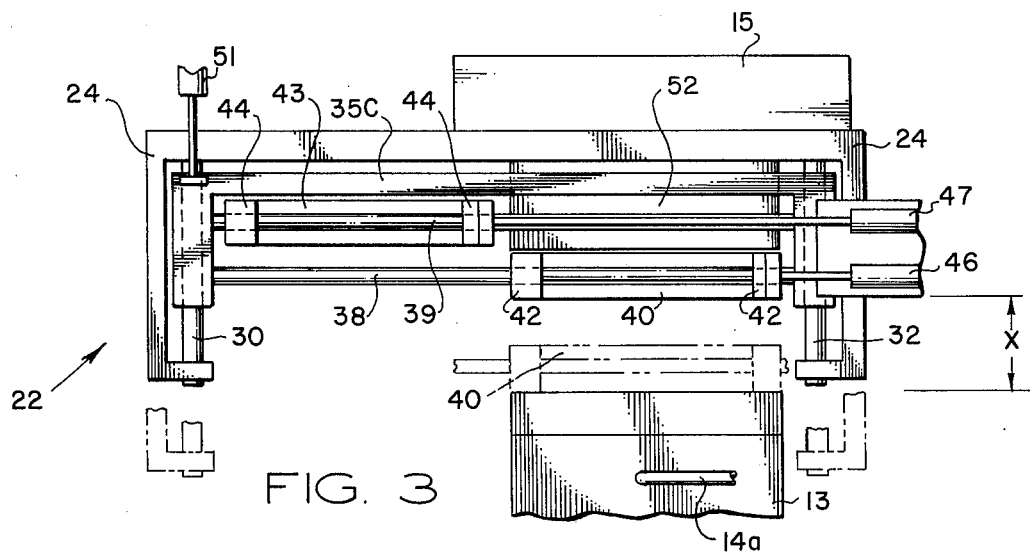
FIG. 3 is a top view of the assembly of FIG. 2 with one of the shuttle molds in position for a molding operation.
Figure 4:
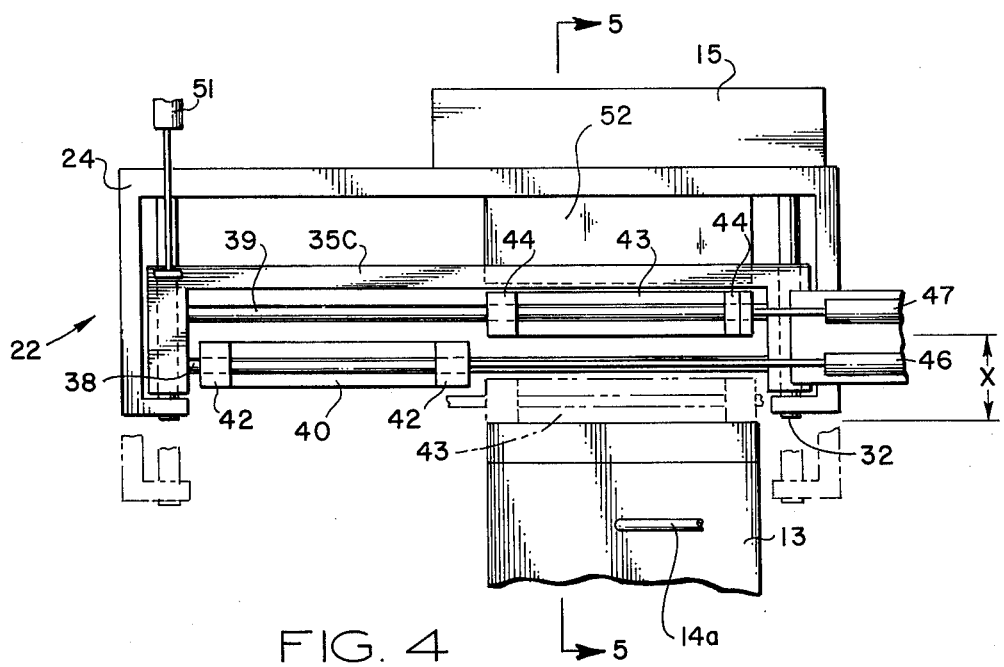
FIG. 4 is a top view of the assembly of FIG. 2 with the other of the shuttle molds shown in position for a molding operation.
Figure 5:
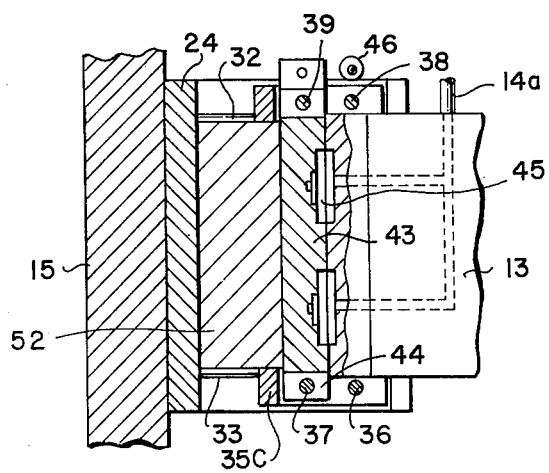
FIG. 5 is a sectional view taken at 5-5 in FIG. 4, but with the platens closed on one of the shuttle molds.

Also, a support block 52 may be provided as illustrated in FIGS. 3–5 to pass through an opening which may be provided through back plate 35c to aid in supporting the molding sections rigidly between the platen when a molding operation is performed.

After the proper molding section has alternatively been placed in or out of the molding zone, movable platen 15 begins to close. As movable platen 15 closes, carriage mechanism 34 is free to move along shafts 29, 30, 32 and 33 so that whichever molding section is in molding positioned can seat out against both the support block 52 and the front molding half mounted on the fixed platen 13. As in conventional in such molding apparatus, guide rods (not shown) may be provided on the face of fixed platen 13, and suitable openings (not shown) aligned to receive the guide rods may be provided in the face of each of molding sections 13 and 15 to ensure proper alignment of the molding sections when closed together with fixed platen 13.

FIGS. 3 and 4 illustrate the sequence of operation of shuttle mold assembly 22 with the respective molding sections shown in opposite positions in the respective views, and FIG. 5 shows the relationship of the platens and molding sections 43 when closed together for a molding operation. Using fixed platen 13 as a reference, FIGS. 3 and 4 also illustrate by the dotted positions the shift of carriage mechanism 34 parallel to the axis of movement of movable platen 15.

Thus, a substantially continuous molding operation can be provided in an otherwise conventional horizontal molding apparatus by the present invention by the use of multiple, shuttling molding sections. Of course, in order to provide runnerless molding with the apparatus described, it is necessary that the time of molding and curing be controlled by circuit 50 as is understood by those skilled in the art. With the modification provided by the present invention the number of molded articles produced over a set period of time can be increased by as much as 30 percent or more, over the number of articles provided by a similar molding apparatus using a single molding section.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A shuttle mold assembly for a horizontal injection molding apparatus including a fixed and movable platen, comprising:
   means on the shuttle assembly for mounting said assembly between said fixed and movable platens;
   a first shuttle mold mounted for movement on said assembly and including at least one molding cavity;
   a second shuttle mold mounted for movement on said assembly and including at least one molding cavity; and
   means connected to the molds for alternatively moving said first and second shuttle molds between a position on said assembly where one of said molds is between said fixed and movable platens for a molding operation and the other of said molds is to the side of said fixed and movable platen and said one of said molds so that loading or unloading operations may be performed on said other of said molds during said molding operation, and a position where said other of said molds is between said fixed and movable platens for another molding operation and said one of said molds is to the side of said fixed and movable platens and said other of said molds so that loading or unloading operations may be performed on said one of said molds during said another molding operation.

2. The assembly of claim 1 further including means for moving said first and second shuttle molds in the direction of movement of said movable platen whereby each of said shuttle molds may be positioned substantially the same distance in said direction from said fixed platen.

3. The assembly of claim 1 wherein said last mentioned means provides for movement of said first and second shuttle molds along axes substantially perpendicular to the axis of movement of said movable platen, and further including means associated with the molds for moving said first and second shuttle molds in the direction of movement of said movable platen whereby each of said shuttle molds may be positioned substantially the same distance in said direction from said fixed platen.

4. The assembly of claim 1 wherein said first mentioned means is an elongated frame member including end flanges and spaced, parallel pairs of shafts between said end flanges, and wherein each of said molding sections is mounted to move along a pair of said shafts between said positions, and further including means for laterally shifting the position of said shafts with respect to said frame.

5. The assembly of claim 1 wherein said means for alternatively moving said first and second shuttle molds includes first and second double acting hydraulic cylinders each connected to one of said shuttle molds.

6. The assembly of claim 2 wherein said means for alternatively moving said first and second shuttle molds includes first and second double acting hydraulic cylinders each connected to one of said shuttle molds, and wherein said means for moving said first and second shuttle molds in the direction of movement of said movable platen includes at least one double acting hydraulic cylinder connected to said assembly.

7. The assembly of claim 1 further including means for moving said first and second shuttle molds in the direction of movement of said movable platens whereby each of said shuttle molds may be positioned substantially the same distance in said direction from said fixed platen.

8. The mold assembly of claim 1 wherein the position of each mold to the side of the other is on the same side of said molding assembly away from said movable and fixed platens.

9. The mold assembly of claim 8 wherein said means for alternatively moving said first and second shuttle molds are hydraulic cylinders each mounted on said assembly on the opposite side from said fixed and movable platens from the side to which said molds are moved when not between said fixed and movable platens.

10. The mold assembly of claim 2 wherein the positions of each mold to the side of the other is on the same side of said molding assembly away from said movable and fixed platens.

11. The mold assembly of claim 10 wherein said means for alternatively moving said first and second shuttle molds are hydraulic cylinders each mounted on said assembly on the opposite side from said fixed and movable platens from the side to which said molds are moved when not between said fixed and movable platens.

12. In an injection molding apparatus including a fixed platen, a movable platen, and means for moving the movable platen towards and away from said fixed platen, the improvement comprising a shuttle molding assembly mounted between said fixed and movable platens, said molding assembly including:
- a first mold mounted for movement on said shuttle assembly and at least one cavity therein that cooperates with one of the platens to define a mold cavity;
- a second mold mounted for movement on said shuttle assembly and including at least one mold cavity therein that cooperates with one of the platens to define a mold cavity;
- means attached to the molds for moving each of said molds movable along said shuttle assembly along axes substantially perpendicular to the axis of movement of said movable platen; and
- said shuttle assembly including means for moving each of said molds along an axis substantially parallel to the axis of movement of said movable platen, whereby said molds can be alternatively placed between said platens so that while molding operations are preformed with one mold, loading and unloading operations may be preformed on the other of said molds.

13. The molding apparatus of claim 12 wherein said injection molding apparatus is horizontally disposed with the movable and fixed platens lying in a vertical plane, and wherein said shuttle molds are movable in a vertical plane to and from a position between said platens.

* * * * *

UNITED STATES PATENT AND TRADEMARK OFFICE
CERTIFICATE OF CORRECTION

PATENT NO. : 3,982,869
DATED : September 28, 1976
INVENTOR(S) : James W. Eggers

It is certified that error appears in the above-identified patent and that said Letters Patent are hereby corrected as shown below:

Column 2, line 13, After "claims" insert a comma -- , --
Column 2, line 41, A new paragraph should be started after the word "provided."
Column 2, line 45, "prespective" should be -- perspective --
Column 3, line 50, After "37" insert -- 38, --
Column 5, line 3, "positioned" should be -- position --
Column 5, line 16, "sections" should be -- section --
Column 6, line 26, After "shafts" insert -- extending --

Signed and Sealed this

Twenty-first Day of December 1976

[SEAL]

Attest:

RUTH C. MASON
*Attesting Officer*

C. MARSHALL DANN
*Commissioner of Patents and Trademarks*